United States Patent
Pouilly et al.

(10) Patent No.: US 9,716,330 B2
(45) Date of Patent: Jul. 25, 2017

(54) FEMALE CONNECTOR WITH CONNECTING BOW AND UNIT COMPRISING SUCH A CONNECTOR

(71) Applicant: Valeo Systemes de Controle Moteur, Cergy Saint Christophe (FR)

(72) Inventors: Aurélien Pouilly, Conflans Sainte Honorine (FR); Bertrand Torcheux, Thiverval Grignon (FR); Suriyaprakash Mayavan, Vriddhachalam (IN)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 0 days.

(21) Appl. No.: 15/028,851

(22) PCT Filed: Sep. 9, 2014

(86) PCT No.: PCT/FR2014/052226
§ 371 (c)(1),
(2) Date: Apr. 12, 2016

(87) PCT Pub. No.: WO2015/055907
PCT Pub. Date: Apr. 23, 2015

(65) Prior Publication Data
US 2016/0261062 A1    Sep. 8, 2016

(30) Foreign Application Priority Data

Oct. 14, 2013  (FR) ...................... 13 59939

(51) Int. Cl.
*H01R 13/11*   (2006.01)
*H01R 12/57*   (2011.01)
*B62D 5/04*    (2006.01)

(52) U.S. Cl.
CPC ........... *H01R 13/112* (2013.01); *H01R 12/57* (2013.01); *H01R 13/113* (2013.01); *B62D 5/04* (2013.01); *H01R 2201/26* (2013.01)

(58) Field of Classification Search
CPC ............ H01R 13/112; H01R 13/11311; H01R 13/113
See application file for complete search history.

(56) References Cited

U.S. PATENT DOCUMENTS

2008/0254688 A1*  10/2008  Bogursky ............ H01R 13/113
                                                  439/858

FOREIGN PATENT DOCUMENTS

DE    10 2009 005949 A1    7/2010

OTHER PUBLICATIONS

International Search Report issued in PCT/FR2014/052226 mailed on Jan. 12, 2015 (2 pages).

(Continued)

*Primary Examiner* — Ross Gushi
(74) *Attorney, Agent, or Firm* — Osha Liang LLP (57) ABSTRACT

The invention relates to a female connector for a connecting blade, which connector is produced from a metal blank and comprises: —a connecting bow (2) comprising at least two contact branches (10, 11) facing one another which define a slot into which to insert the connecting blade and which are intended to clamp the connecting blade, —and at least one fixing base intended to rest against a circuit in order to be fixed thereto, characterized in that the two contact branches (10, 11) each comprise a bowed contact end which is connected by a straight joining segment (30, 30') to a curved "U"-shaped or "C"-shaped web situated at the opposite end from and facing the insertion slot, said contact end having at least a convex surface oriented towards the inside of the insertion slot, and in that one of the two contact branches (Continued)

(10), referred to as the main branch (10), laterally in the region of the corresponding joining segment (30) bears two fixing assemblies each one comprising a fixing base, the two fixing assemblies being symmetric with respect to the web and situated one on either side of the joining segment (30) of the main branch (10).

10 Claims, 4 Drawing Sheets

(56) References Cited

OTHER PUBLICATIONS

Written Opinion of the International Searching Authority issued in PCT/FR2014/052226 mailed on Jan. 12, 2015 (7 pages).

\* cited by examiner

FEMALE CONNECTOR WITH CONNECTING BOW AND UNIT COMPRISING SUCH A CONNECTOR

The present invention relates to the technical field of female connectors intended to receive a male connector in the form of a blade so as to form an electrical connection system that can be plugged a number of times.

In the above field, it is known to produce a female connector by punching a metal blank such that the female connector is formed by a connecting bow comprising two contact branches facing one another which define a slot for insertion of the connecting blade and which are intended to clamp the connecting blade. The female connector also comprises a foot for fixing to a circuit. The female connector thus formed is produced by punching a metal blank.

A female connector of this type makes it possible to effectively connect a connecting blade in an easily detachable manner in a direction of insertion parallel to the branches of the female connector. However, a female connector of this type has the disadvantage of not offering quality contact between the male connector and the female connector allowing the passage of high-strength current without risk of overheating insofar as the contact surface of the branches is formed by the edge of the metal blank, which makes it necessary to multiply the number of bows. In addition, in the event of a misalignment between the bow and the blade received thereby, the quality of the contact is altered such that the risks of heating are increased.

There is thus a need for a new type of female connector which offers an improved quality of contact so as to avoid the dangerous risks of heating.

In order to achieve this objective, the invention relates to a female connector for a connecting blade, which connector is produced from a metal blank and comprises:

a connecting bow comprising at least two contact branches facing one another which define a slot for insertion of the connecting blade and which are intended to clamp the connecting blade, and at least one foot for fixing to a circuit.

In the female connector according to the invention, the two contact branches each comprise a bowed contact end which is connected by a straight joining segment to a curved "U"-shaped or "C"-shaped web situated at the opposite end and facing the insertion slot, said contact end having at least one convex surface oriented towards the inside of the insertion slot, and in that each contact branch has a width, measured parallel to a median plane of the receiving space, greater than or equal to the thickness of the metal blank.

A female connector of this type, which can be produced by punching and bending a metal blank, makes it possible to offer a good quality of connection on account of the contact surface offered by the ends of the contact branches. In addition, the U shaping of the bow formed by bending the blank parallel to the larger faces thereof, i.e. perpendicularly to its edges, makes it possible to obtain a significant radius and therefore an increased contact pressure so as to reduce the contact resistance, which allows the passage of increased current without risk of heating.

In particular, the fixing foot is intended to rest against a circuit, in particular in order to be fixed thereto.

In particular, the two contact branches are intended to clamp the connecting blade via their bowed contact ends. The joining segment of a contact branch forms a "U"-shaped or "C"-shaped branch of the curved web.

In accordance with a preferred embodiment of the invention, one of the two contact branches, referred to as the main branch, laterally in the region of the corresponding joining segment, bears at least one fixing assembly comprising said fixing foot.

In accordance with a variant of this preferred embodiment, the fixing assembly comprises a lateral arm situated in the plane of the joining segment and extended by a leg, which extends parallel to the joining segment and at the end opposite the contact end and which bears, at the end opposite the lateral arm, the fixing foot formed by bending the free end of the leg.

The provision of a fixing assembly of this type makes it possible to provide the connecting bow with the ability to move perpendicularly to the direction of extension of the insertion slot so as to take into account positioning tolerances of the connecting blade.

In accordance with a variant of the preferred embodiment, the main branch bears two fixing assemblies, which are symmetrical with respect to the web and are situated one on either side of the joining segment of the main branch. These two fixing assemblies ensure a stability of the female connector, in particular during the insertion of the connecting blade. In addition, these two fixing assemblies increase the mechanical strength of the fixing of the connector to the circuit and also the quality of the electrical connection of the female connector to the conductive support bearing said connector.

In accordance with another variant of the preferred embodiment, the leg of the fixing assembly has a height, measured between a fixing face of the corresponding fixing foot and an opposite side of the lateral arm, which is greater than or equal to 30% of the total height of the female connector measured between the fixing face of the fixing foot and the point of the contact end (14) distanced furthest from the fixing face. In particular, the fixing face of the foot corresponds to the face of the foot intended to come into contact with the circuit.

This variant of this embodiment makes it possible, when the metal blank used has a constant thickness, to provide each fixing assembly with a radius smaller than the radius of the connecting bow, such that, in the event of a misalignment of the blade with the receiving slot, this misalignment is compensated for by the flexing of the leg or legs of the fixing assemblies when the contact ends of the bow are pressed against the two faces of the blade.

In the same preferred embodiment and yet in accordance with a different variant of the preferred embodiment of the invention, the leg of the fixing assembly has a width l', measured in particular parallel to a median plane of the slot, which is less than the width l of the contact branches.

In accordance with a feature of the invention, the contact end of a first contact branch is connected to the joining segment by a bowed intermediate segment of reverse concavity compared with the contact end. In particular, said intermediate segment makes it possible to position the contact end of the first branch set back from a plane tangent to an inner face of the joining segment of the first branch. This feature makes it possible to assure an adjustment of the position of the receiving slot with respect to the first branch, in particular in a direction substantially perpendicular to the direction of extension of the slot.

In accordance with a variant of this feature, the contact surface of the contact end of a second contact branch is in part at least tangent to a plane tangent to an inner face of the joining segment of the first contact branch. The receiving slot is therefore substantially centered on the centerline or the median plane of the joining segment and the legs. Thus, the median plane of the receiving slot is substantially aligned with the leg or legs of the fixing assemblies, such that the forces resulting from the insertion of the blade in the receiving slot are substantially aligned with the legs, which prevents their deformation or flexing during said insertion.

In accordance with a variant of the invention the contact branch comprising the bowed intermediate segment is the primary contact branch.

In accordance with a feature of the invention, each contact end is slotted and comprises at least two parallel contact fingers. The space delimiting the two contact fingers in the region of each branch of the bow extends parallel to the branches and defines the contact fingers, which make it possible to optimize the quality of contact with the blade by allowing an adjustment to the shape thereof. The space separating the two fingers therefore extends in a longitudinal direction of the contact branch.

The invention also relates to a female connector for a connecting blade, which connector is produced from a metal blank and comprises:

a connecting bow comprising at least two contact branches facing one another which define a slot for insertion of the connecting blade and which are intended to clamp the connecting blade, and at least one fixing foot intended to rest against a circuit in order to be fixed thereto, characterized in that the two contact branches each comprise a bowed contact end which is connected by a straight joining segment to a curved "U"-shaped or "C"-shaped web situated at the opposite end and facing the insertion slot, said contact end having at least one convex surface oriented towards the inside of the insertion slot, and in that one of the two contact branches, referred to as the main branch, laterally in the region of the corresponding joining segment, bears two fixing assemblies each comprising a fixing foot, the two fixing assemblies being symmetrical with respect to the web and situated one on either side of the joining segment of the main branch.

In particular, each contact branch has a width, measured parallel to a median plane of the insertion slot, greater than or equal to the width of the metal blank.

This female connector may comprise one of the features described above for the other connector according to the invention and compatible with said female connector.

The invention also relates to a unit for supplying power to a power-steering motor comprising at least one supply conductor on which there is fixed at least one female connector according to the invention.

Of course, the different features, variants and embodiments of the invention can be combined with one another in various combinations, provided these are compatible with one another and are not mutually exclusive.

In addition, various other features of the invention will become clear from the accompanying description provided with reference to the drawings, which illustrate a non-limiting embodiment of a female connector according to the invention.

Figure 1:
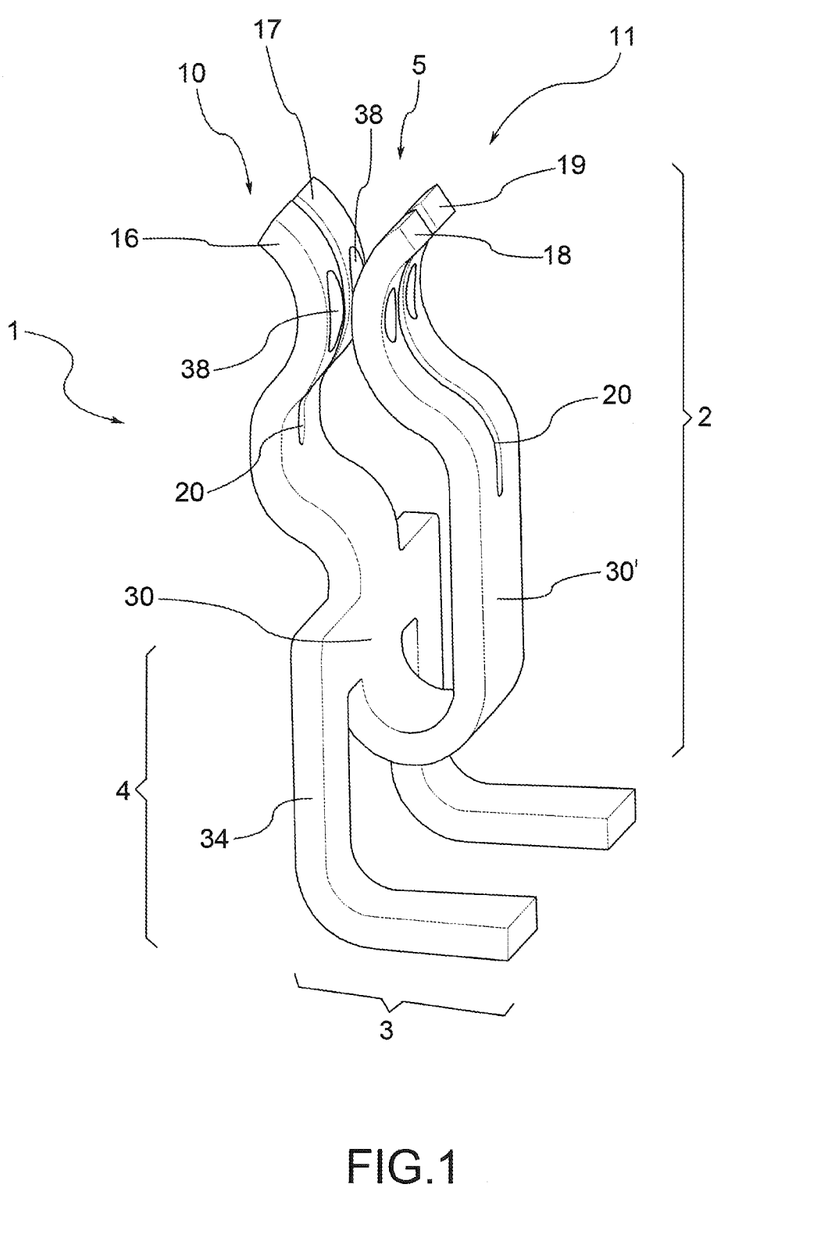
FIG. 1 is a schematic perspective view of a female connector according to the invention.

A female connector according to the invention, as illustrated in FIG. 1 and designated by the reference 1, comprises three separate functional regions, that is to say a connecting bow 2, a fixing region 3 for fixing to an electrical circuit (not shown), and a flexing region 4, which assures the connection between the fixing region 3 and the connecting bow 2. This breakdown into three regions each ensuring a single function makes it possible to guarantee the quality of the connection to a blade (not shown) situated in an insertion slot defined by the bow 2.

The female connector 1 according to the invention may be formed by punching, stamping and bending of a metal blank in accordance with techniques well known to a person skilled in the art, such that there is no need to describe them here in detail. The female connector 1 according to the invention thus forms a monoblock assembly. The metal used may be of any suitable type and in particular may have appropriate surface treatments depending on the way in which the connector is fixed to the corresponding electrical conductor.

Figure 2:
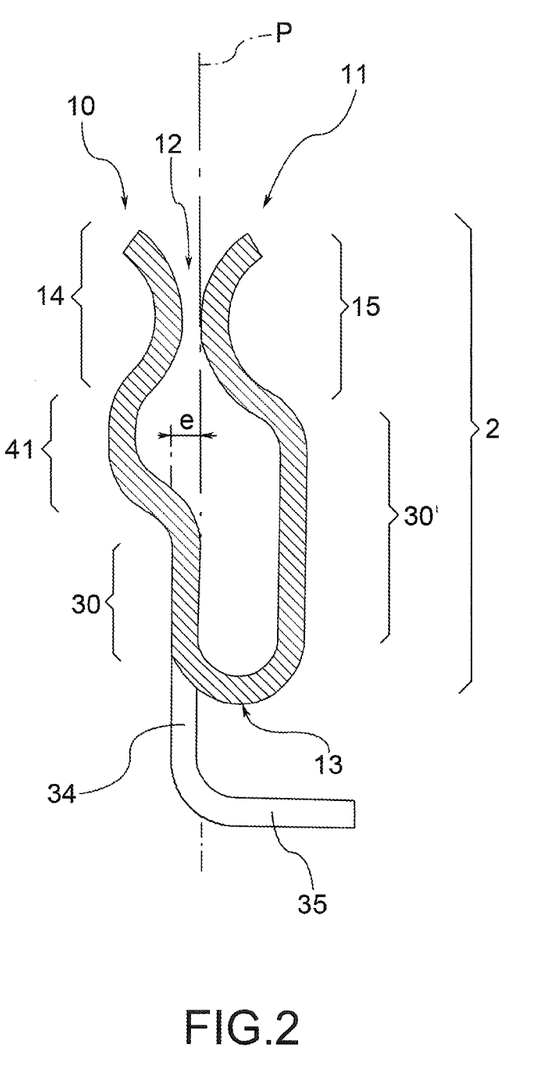
FIG. 2 is a longitudinal section of a female connector according to the invention.
Figure 3:
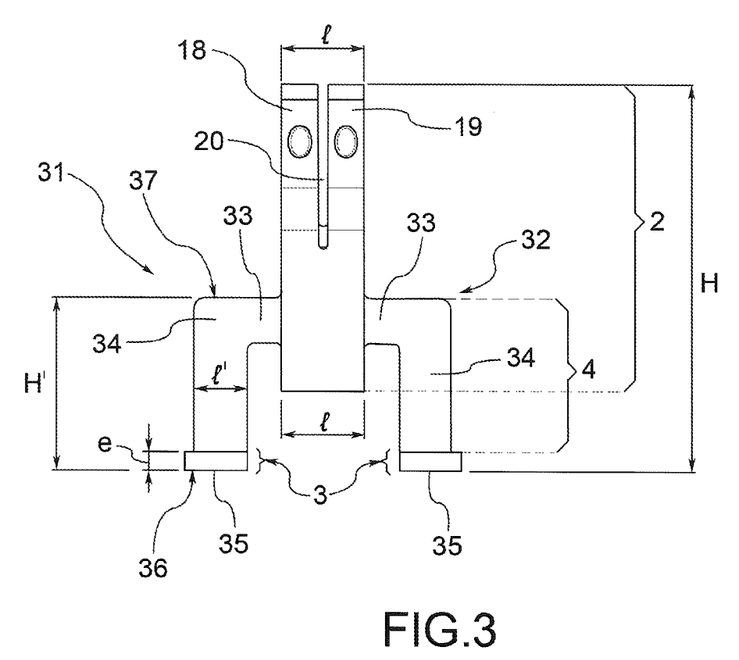
FIG. 3 is a view from the front of the female connector illustrated in FIGS. 1 and 2.

As shown, in particular in FIG. 2, the connecting bow 2 of the female connector 1 comprises two contact branches 10 and 11 which define a slot 12 for insertion of a connecting blade (not shown). The two contact branches 10 and 11 are connected to one another at their base at the end opposite the slot 12 by a "U"-shaped or "C"-shaped web.

At the end opposite the web 13, the two contact branches 10 and 11 each comprise a contact end, 14 and 15 respectively. Each contact end 14 and 15 has a bowed shape of which the concavity is oriented towards the outside of the slot 12, such that the contact ends offer a convex surface towards the inside of the insertion slot 12. The contact branch 10, 11, in particular the contact end 14, 15, has a width l, measured parallel to a median plane P of the insertion slot 12, greater than the thickness e of the metal blank from which the female connector 1 is formed. It must be noted that the contact branches 10 and 11 have the same width l over their entire length, which also corresponds in the present case to the width of the web 13.

The contact ends 14 and 15 are each divided into two contact fingers, 16, 17 and 18, 19 respectively, by a longitudinal slot 20 which extends over just part of the corresponding contact branch.

Each contact branch 10, 11 comprises, between the web 13 and the corresponding contact end 14, 15, a joining segment 30, 30' respectively, which is straight or rectilinear as viewed from the side, as can be seen in FIG. 2. The rectilinear nature of the joining segments 30 and 30' provides the web 13 with a general U shape.

The joining segment 30 of the first branch 10, also referred to as the main branch, bears two fixing assemblies 31, 32, which are symmetrical to one another with respect to said main branch 10. Each fixing assembly 31, 32 comprises a lateral arm 33, which is situated in the plane of the connecting segment 30. The arm 33, at the end opposite the joining segment 30, bears a leg 34, which extends parallel to the main branch 10 and is also coplanar with the joining segment 30. Each leg 34, at the end opposite the lateral arm 33 and the contact end 14, carries a fixing foot 35 formed by bending the free end of said leg 34. The fixing foot 35 is intended to be fixed to a conductive support such that the fixing face 36 of said foot is in contact with said support. The fixing face in particular produces electrical contact between the foot and said support.

In order to assure a good flexibility of the legs 34, the latter have a height H', measured between the fixing face 36 of the corresponding fixing foot 35 and the opposite side 37 of the lateral arm 33, greater than or equal to 30% of the total height H of the female connector 1 measured between the fixing face 36 of the fixing foot 35 and the most distant point of the contact ends 18, 19.

Figure 4:
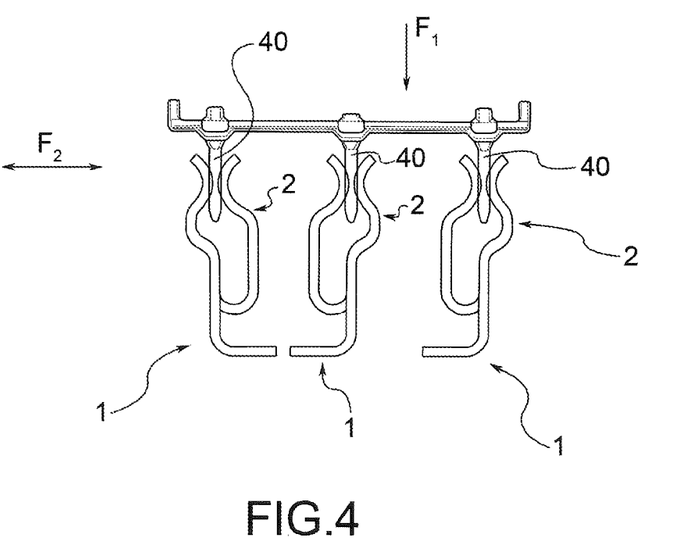
FIG. 4 is a view from the side of a connection system implementing three female connectors according to the invention, such as the female connector illustrated in FIG. 1.
Figure 5:
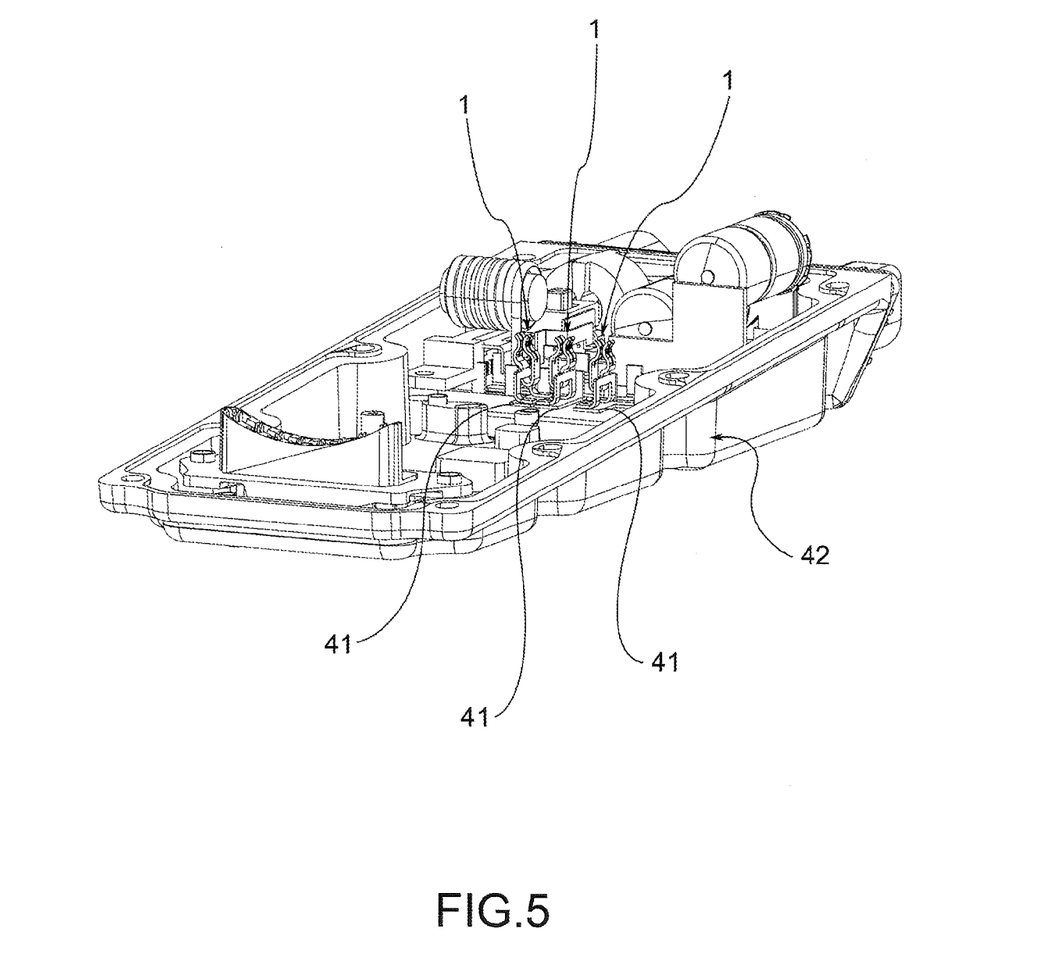
FIG. 5 is a schematic perspective view of a power supply unit comprising three female connectors according to the invention.

Thus, in the event of the engagement of a contact blade 40 with the slot 12 in the direction of the arrow F1, as shown in FIG. 4, the connecting bow 2 can move to the left or to the right in FIG. 4, as indicated by the double-headed arrow F2, in order to adapt to any potential misalignment of the blade 40. This is all the more useful when a plurality of female connectors 1 according to the invention are used in parallel.

In addition, in order to guarantee that in the event of misalignment of the blade 40 with the slot 12 this fault is not compensated for by the spacing of the contact branches 10 and 11 but by the flexing of the legs 34, each leg 34 has a width l' smaller than the width l of the contact branches 10, 11. Thus, the connecting bow 2 has a radius greater than the radius of the flexing region, such that the contact branches 10, 11 maintain a good contact pressure on the blade 40. In this way, the contact force, and therefore the electrical resistance, is guaranteed independently of the misalignment of the bow 2/blade 40.

In addition, in accordance with the illustrated example, in order to assure that the insertion forces of the blade are exerted as far as possible in the plane of the legs 34, the contact end 14 of the main branch 10 is connected to the joining segment 30 by a bowed intermediate segment 41 of reverse concavity compared with the contact end 14. In particular, the intermediate segment 41 has a concavity such that the contact surface of the contact end 14 of the main branch 10 is set back from a plane P tangent to the inner face of the joining segment 30. In accordance with the illustrated example, the contact face of the contact end 15 of the other branch 11 is substantially tangent to the plane P. Thus, in the connector, the slot 12 is substantially centered on the centerline or the median plane of the joining segment 30 and the legs 34.

A female connector 1 of this type can thus be used in various electrical or electronic systems or sub-systems, such as a unit 42, as shown in FIG. 4, for supplying power to a motor, belonging in particular to a power-steering assembly. In accordance with this example of implementation, each female connector 1 is soldered to a supply conductor or a supply bar 41 integrated in the power supply unit. Said power supply unit 42 may then be adapted on a power-steering assembly in accordance with a movement in translation parallel to the median plane of the insertion slot such that each female connector engages with a connecting blade (not shown) borne by the power-steering assembly (not shown). In accordance with the illustrated example and so as to assure the power supply of a three-phase motor, the unit 42 comprises three power supply bars 41, each equipped with a female connector 1 according to the invention.

The contact ends 10, 11, in particular the contact fingers 16, 17, 18, 19 may comprise a respective lobe 38. The lobe 38 may be obtained by localized deformation of the contact end 10, 11. The lobe 38 defines a bulge towards the inside of the positioning slot 12. The lobe 38 thus allows point-point contact between the contact branch 10, 11 and the blade 40 introduced into the slot 12. In the example illustrated in FIG. 1, the connector allows two contact points twice. The lobe 38 can be produced by stamping.

Of course, various modifications can be made to the female connector according to the invention within the scope of the accompanying claims.

The invention claimed is:

1. A female connector for a connecting blade, which connector is produced from a metal blank and comprises:
   a connecting bow comprising at least two contact branches facing one another which define a slot for insertion of the connecting blade and which are intended to clamp the connecting blade; and
   at least one fixing foot intended to rest against a circuit in order to be fixed thereto,
   wherein the two contact branches each comprise a bowed contact end which is connected by a straight joining segment to a curved "U"-shaped or "C"-shaped web situated at the opposite end and facing the insertion slot,
   said contact end having at least one convex surface oriented towards the inside of the insertion slot,
   wherein one of the two contact branches, referred to as the main branch, laterally in the region of the corresponding joining segment, bears two fixing assemblies each comprising a fixing foot, the two fixing assemblies being symmetrical with respect to the web and situated one on either side of the joining segment of the main branch, and
   wherein each contact end is slotted and comprises at least two parallel contact fingers.

2. The female connector as claimed in claim 1, wherein each contact branch has a width, measured parallel to a median plane of the insertion slot, greater than or equal to the thickness of the metal blank.

3. The female connector as claimed in claim 1, wherein the fixing assembly comprises a lateral arm situated in the plane of the joining segment and extended by a leg, which extends parallel to the joining segment and at the end opposite the contact end and which bears, at the end opposite the lateral arm, the fixing foot formed by bending the free end of the leg.

4. The female connector as claimed in claim 3, wherein the leg of the fixing assembly has a height, measured between a fixing face of the corresponding fixing foot and a side opposite the lateral arm, which is greater than or equal to 30% of the total height of the female connector measured between the fixing face of the fixing foot and the point of the contact end distanced furthest from the fixing face.

5. The connector as claimed in claim 3, wherein the leg of the fixing assembly has a width less than the width of the contact branches.

6. The female connector as claimed in claim 1, wherein the contact end of a first contact branch is connected to the joining segment by a bowed intermediate segment of reverse concavity compared with the contact end.

7. A female connector for a connecting blade that is produced from a metal blank, the female connector comprising:
   a connecting bow comprising at least two contact branches facing one another which define a slot for insertion of the connecting blade and which are intended to clamp the connecting blade; and
   at least one fixing foot intended to rest against a circuit in order to be fixed thereto,
   wherein the at least two contact branches each comprise a bowed contact end which is connected by a straight joining segment to a curved "U"-shaped or "C"-shaped web situated at the opposite end and facing the insertion slot, said contact end having at least one convex surface oriented towards the inside of the insertion slot, wherein one of the two contact branches, referred to as the main branch, laterally in the region of the corresponding joining segment, bears two fixing assemblies each comprising a fixing foot, the two fixing assemblies being symmetrical with respect to the web and situated one on either side of the joining segment of the main branch, wherein the contact end of a first contact branch is connected to the joining segment by a bowed intermediate segment of reverse concavity compared with the contact end, and wherein the contact surface of the contact end of a second contact branch is in part at least tangent to a plane tangent to an inner face of the joining segment of the first contact branch.

8. The female connector as claimed in claim 7, wherein the contact branch comprising the bowed intermediate segment is the main branch.

9. A unit for supplying power to a power-steering motor comprising at least one supply conductor, on which there is fixed at least one female connector, produced from a metal blank and comprising:
- a connecting bow comprising at least two contact branches facing one another which define a slot for insertion of the connecting blade and which are intended to clamp the connecting blade; and
- at least one fixing foot intended to rest against a circuit in order to be fixed thereto,
- wherein the two contact branches each comprise a bowed contact end which is connected by a straight joining segment to a curved "U"-shaved or "C"-shaped web situated at the opposite end and facing the insertion slot,
- said contact end having at least one convex surface oriented towards the inside of the insertion slot, and
- wherein one of the two contact branches, referred to as the main branch, laterally in the region of the corresponding-joining segment, bears two fixing assemblies each comprising a fixing foot, the two fixing assemblies being symmetrical with respect to the web and situated one on either side of the joining segment of the main branch.

10. A female connector for a connecting blade, which connector is produced from a metal blank and comprises:
- a connecting bow comprising at least two contact branches facing one another which define a slot for insertion of the connecting blade and which are intended to clamp the connecting blade; and
- at least one fixing foot intended to rest against a circuit in order to be fixed thereto,
- wherein the two contact branches each comprise a bowed contact end which is connected by a straight joining segment to a curved "U"-shaped or "C"-shaped web situated at the opposite end and facing the insertion slot,
- said contact end having at least one convex surface oriented towards the inside of the insertion slot,
- wherein one of the two contact branches, referred to as the main branch, laterally in the region of the corresponding joining segment, bears two fixing assemblies each comprising a fixing foot, the two fixing assemblies being symmetrical with respect to the web and situated one on either side of the joining segment of the main branch, and
- wherein the female connector lacks a planar surface above the insertion slot.

* * * * *

UNITED STATES PATENT AND TRADEMARK OFFICE
CERTIFICATE OF CORRECTION

| | |
|---|---|
| PATENT NO. | : 9,716,330 B2 |
| APPLICATION NO. | : 15/028851 |
| DATED | : July 25, 2017 |
| INVENTOR(S) | : Aurélien Pouilly et al. |

It is certified that error appears in the above-identified patent and that said Letters Patent is hereby corrected as shown below:

In the Claims

At Column 7, Claim number 9, Line number 33, the word "'U'-shaved" should read -- "U"-shaped --.

Signed and Sealed this
Thirty-first Day of October, 2017

Joseph Matal
*Performing the Functions and Duties of the
Under Secretary of Commerce for Intellectual Property and
Director of the United States Patent and Trademark Office*